United States Patent [19]
Chow

[11] 3,711,842
[45] Jan. 16, 1973

[54] SINGLE WALL MAGNETIC DOMAIN LOGIC ARRANGEMENT

[75] Inventor: Woo Foung Chow, Berkeley Heights, N.J.

[73] Assignee: Bell Telephone Laboratories, Inc., Murray Hill, Berkeley Heights, N.J.

[22] Filed: Dec. 30, 1971

[21] Appl. No.: 214,192

[52] U.S. Cl. ........................340/174 TF, 340/174 SR
[51] Int. Cl. ..........................G11c 11/14, G11c 19/00
[58] Field of Search ..........................................34/174

[56] References Cited

UNITED STATES PATENTS 3,618,054 11/1971 Bonyhard .......................340/174 TF
3,636,531 1/1972 Copeland........................340/174 TF
3,641,518 2/1972 Copeland........................340/174 TF
3,646,530 2/1972 Chow.............................340/174 TF

*Primary Examiner*—Stanley M. Urynowicz, Jr.
*Attorney*—R. J. Guenther et al.

[57] ABSTRACT

A pair of closed loop domain propagation channels each of which exhibits a domain in only one of two laterally displaced positions in each stage is adapted herein to provide a simple autonomous line scanned by separating associated portions of the two channels into two independent but synchronously operated paths or tracks. Related logic operations are carried out in the separate tracks, in a manner consistent with the requisite complementary domain format in an input portion of the channels where the tracks are not physically separated.

9 Claims, 8 Drawing Figures

SINGLE WALL MAGNETIC DOMAIN LOGIC ARRANGEMENT

FIELD OF THE INVENTION

This invention relates to data processing arrangements and more particularly to such arrangements in which information is represented as single wall domains.

The term "single wall domain" refers to a magnetic domain which is movable in a layer of a suitable magnetic material and is encompassed by a single domain wall which closes on itself in the plane of that layer.

Propagation arrangements for moving a domain are designed to produce magnetic fields of a geometry determined by the layer in which a domain is moved. Most materials in which single wall domains are moved are characterized by a preferred magnetization direction, for all practical purposes, normal to the plane of the layer. The domain accordingly comprises a reverse magnetized domain which may by thought of as a dipole oriented transverse, nominally normal to the plane of the layer. Accordingly, the movement of a domain is accomplished by the provision of an attracting magnetic field normal to the layer and at a localized position offset from the position occupied by the domain. A succession of such fields causes successive movements of a domain as is well known.

One propagation arrangement comprises a pattern of electrical conductors each designed to form a conductor loop which generates the requisite fields when externally pulsed. The loops are interconnected and pulsed in a three-phase manner to produce shift register operation.

Copending application Ser. No. 49,273, filed June 24, 1970 for J. A. Copeland III, now U.S. Pat. No. 3,636,531, discloses a domain propagation arrangement in which single wall domains are displaced from stage to stage in a propagation channel having a magnetically soft rail aligned along the axis of the channel. A pair of serpentine conductors offset from one another, defines the stages and moves domains in a selected direction therealong when pulsed positively and negatively in an alternating manner. The rail is of a geometry to define two laterally displaced positions for a domain to either side thereof—the "one" or "zero" side—in each stage.

This lateral displacement coding (LDC) arrangement can be implemented with only a single serpentine conductor if, for example, an array of magnetically soft dots are present for offsetting domains along the axis of the channel from the positions to which pulses in the conductor move them. Moreover, the rail itself, particularly for materials with minute domains requiring equally minute rail widths, the rail may be defined by parallel, magnetically soft rectangles aligned vertically with respect to the channel axis for defining a pair of laterally displaced positions for a domain in each stage of the channel.

My copending application Ser. No. 89,821, filed Nov. 16, 1970, now U.S. Pat. No. 3,680,067 describes an autonomous line scanner in which information representations of the states of a plurality of telephone lines are stored as complementing domain patterns of a pair of synchronously operated domain propagation channels. The term "autonomous line scanner" is used to describe a scanner which stores, internally, information representative of the conditions of a plurality of lines during each of consecutive scan periods and transmits signals to a central office only when changes in line conditions occur. The present invention adapts the lateral displacement coding (LDC) arrangement to scanning circuits of this type.

BRIEF DESCRIPTION OF THE INVENTION

The present invention is based on the realization, that the lateral displacement coding achieved with the domain rail organization described above provides inherently complementary (viz., conventional two-rail systems) domain patterns representative of the information stored and that the complementary patterns can be physically separated into spaced apart channels (viz., two conventional single rail systems) for achieving domain interaction as required in accordance with autonomous line scanner operation.

In one embodiment of this invention, a scan signal causes a (present look) domain pattern representative of the states of a plurality of lines to be introduced to an input portion of a first lateral displacement (LDC) domain channel as described in my copending application Ser. No. 76,882, filed Sept. 30, 1970 now U.S. Pat. No. 3,646,530 and then to be advanced into a subsequent portion of the channel. The consecutive positions into which the patterns to the two sides of the channel are advanced in each instance constitute two separate paths each containing a pattern of domains (viz., data bits) which is the complement of the pattern in the other path. Moreover, each path is doubled back on itself in a manner to move consecutive bits into an interaction position for effecting logic operations between a first set of bits in the path and the next consecutive set of bits (viz., present and last-look representations) for the corresponding line as the bits are so advanced. The separate paths then physically converge to form a lateral displacement channel again at the input portion.

A second lateral displacement channel, also designed to separate similarly into two paths, has each of its paths linked to associated paths of the first channel at the interaction positions. The second channel functions as a previous-look store having domains therein moved to a spur track only when a change first occurs in the present and last-look stores. The spur track is a domain propagation channel operative synchronously with the first and second channels to return any domain in it to the position in the second channel which is the complement of the position from which that domain originated.

DETAILED DESCRIPTION

Figure 1:
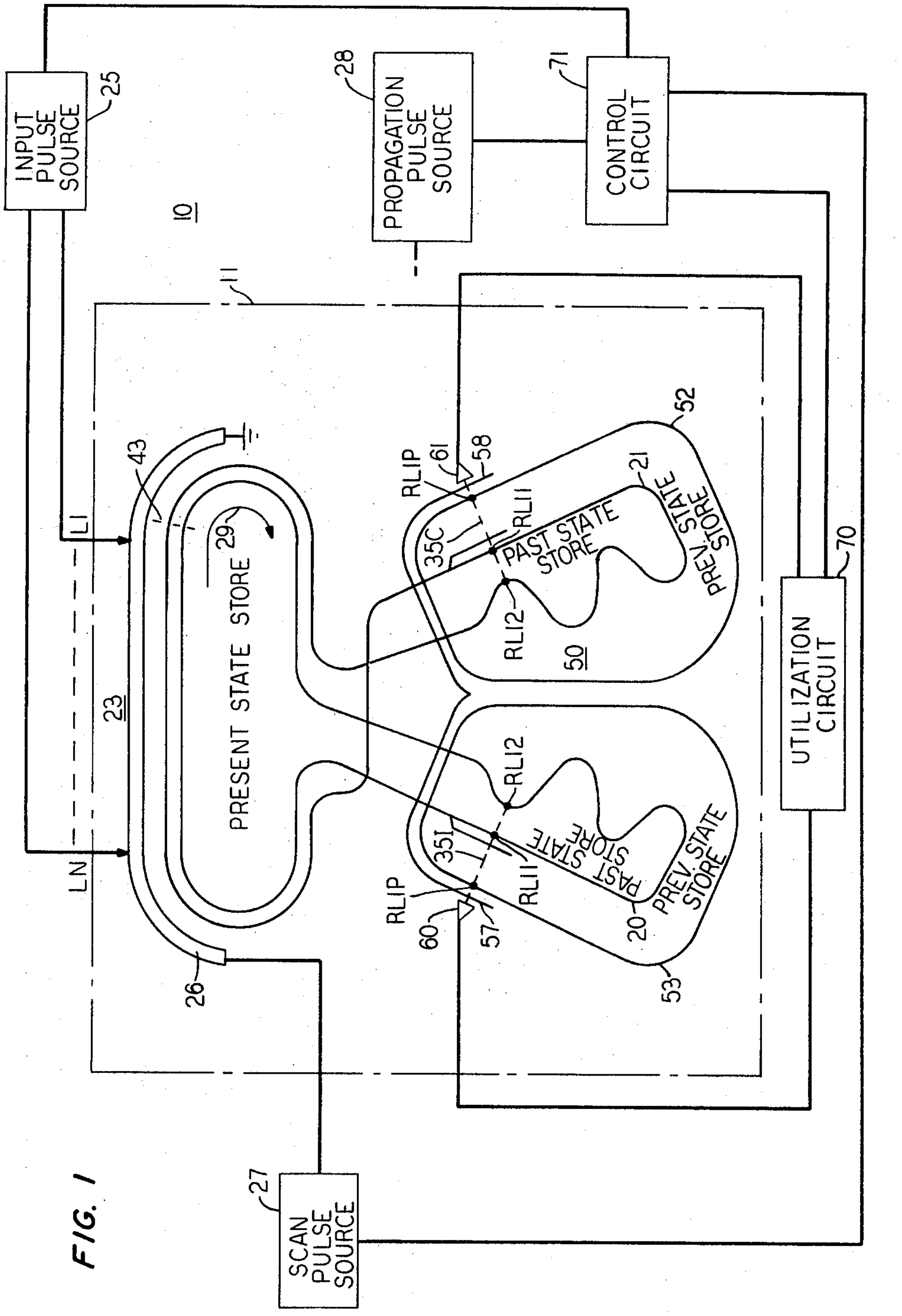
FIG. 1 is a line diagram of an autonomous line scanner in accordance with this invention.
Figure 2:
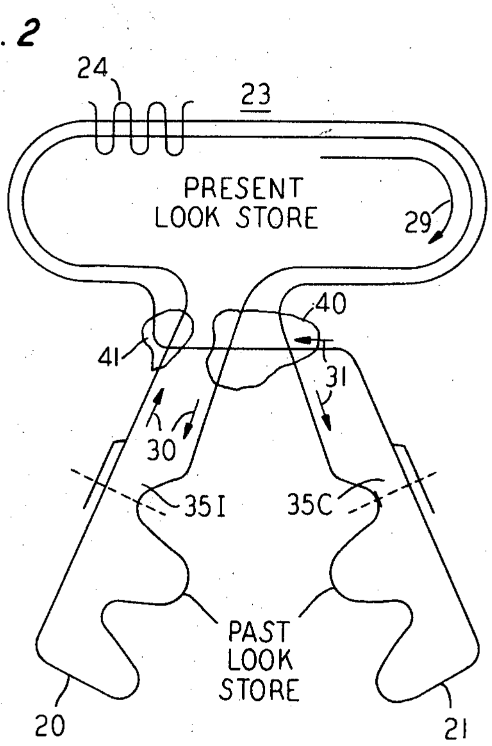
FIGS. 2 and 7 are line diagrams of lateral displacement domain channel arrangements cooperating to perform the autonomous scanning operation of the scanner of FIG. 1.

FIG. 1 shows a line diagram of an illustrative LDC autonomous line scanner 10. The scanner is defined in a layer 11 of material in which single wall domains can be moved. Each continuous line in the FIG. represents one channel of an LDC channel pair. For example, FIG. 1 shows two closed lines 20 and 21 which come into close proximity at portion 23 and extend into separate paths as shown in FIG. 2.

It is helpful to recall that an LDC arrangement includes many stages defined by a serpentine conductor drive. In position 23 where channels 20 ad 21 are in close proximity, a serpentine drive conductor 24 overlies both channels, each turn of the conductor defining an associated stage of the two channels as is illustrated in FIG. 2.

Each stage of the LDC arrangement is occupied by a single wall domain. In position 23, the domain in each stage is normally in a reference position in the exterior (reference) channel (21). The absence of a domain accordingly "occurs" in each of the associated stages of the interior (storage) channel (20). When a domain is moved from the reference channel to the associated stage of the storage channel in portion 23, the movement records the presence of a signal in the associated line during a scan operation. Arrows L1–LN represent such lines. The lines, typically telephone auxiliary lines, are connected to an input pulse source (viz: telephone sets) represented by block 25 of FIG. 1.

A scan operation is initiated responsive to a pulse applied to a control conductor 26 in FIG. by a scan pulse source represented by block 27. An input arrangement for diverting domains from reference positions to associated information storage positions representative of line condition information during a scan operation is fully described in my above-mentioned copending application. Suffice it to say at this juncture, that line condition information for N lines L1 through LN is supplied in portion 23 which functions accordingly as a "-present look stage" and information is advanced N stages thereafter by pulses applied to the serpentine drive conductor arrangement 24 by propagation pulse source 28 of FIG. 1. Information is assumed to move clockwise in portion 23 as indicated by curved arrow 29 in FIGS. 1 and 2.

The domains diverted to the interior channel of portion 23 are taken to represent binary ones. Those not so diverted represent zeros. When information is advanced at the termination of each scan period, a pattern of binary ones advances into channel 20 and a pattern of binary zeros (complementary domain pattern) advances into channel 21. A glance at arrows 30 and 31 in FIG. 2 indicates that information flows clockwise in channel 20 and counter clockwise in channel 21. The information stored during a first scan operation and thus advanced is now stored in channels 20 and 21 which can be seen consequently to serve the function of a "past look store."

A next subsequent (viz., second) scan operation introduces new domain patterns similarly representative of the N line conditions. This subsequent set of representations may be considered the "present-look" prior to the advance of the representations. Each of the present and past look "stores" is now occupied by N bits and the complements of those bits. All of these bits are again advanced N stages at the termination of the second scan operation. During this second advance of information, each stored bit representative of the condition of a first line is compared to the bit representative of the preceding condition of that first line at positions 35I and 35C for the information (storage) and complementary (reference) channels 20 and 21, respectively as shown in FIG. 2.

The comparisons of stored bits and the complements of them with previous like representations of line conditions is facilitated herein by a unique feature of the present invention. That is, the channels of the LDC channel pair at portion 23 are physically separated into independent but synchronously operated channels by a separation of the magnetically soft permalloy elements which define laterally displaced positions in each stage of the channel pair into separate elements each set of which defines a channel of consecutive positions in which information is represented on a domain-no domain basis.

Figure 3:
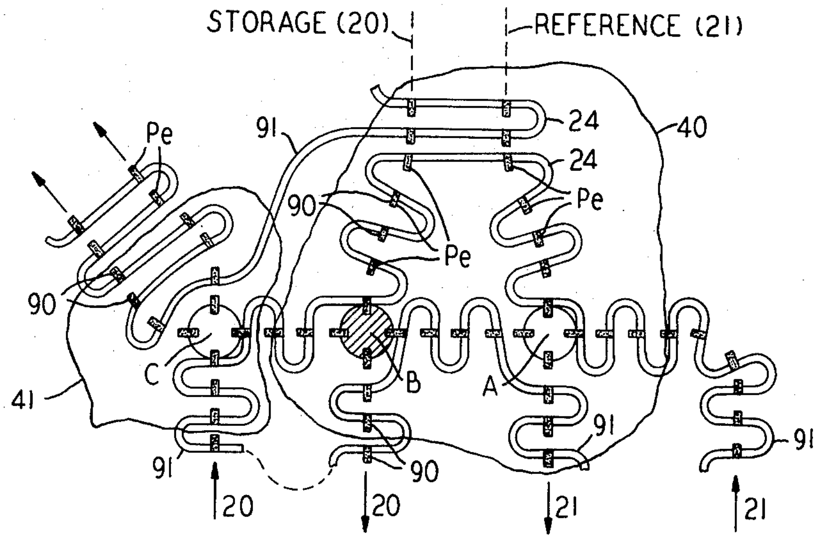
FIGS. 3 through 6 and 8 are schematic illustrations of portions of the arrangements of FIGS. 1, 2, and 7.

FIG. 3 shows the permalloy elements pe at the juncture 40 of FIG. 2 where the channel pair diverges into two separate channels. The figure also shows the geometry of conductor 24 of FIG. 1 at this juncture.

FIG. 3 also shows the permalloy elements and the geometry of conductor 24 at juncture 41 of FIG. 2 where channels converge again into a channel pair for returning recirculating information to the channel pair area 23. It is helpful to note that recirculating positions A, B, and C are defined at the intersections of the separate channels and are occupied by idler domains in a familiar manner.

We will now direct our attention to the manipulation of domain patterns in the portions of the channels 20 and 21, the portions between the junctures 40 and 41 shown in FIG. 3, and will show that information enters and exits from these portions in a form compatible with the complementary representation required for the channel pair portion 23 even though logic operations are carried out in the respective channels.

Figure 4:
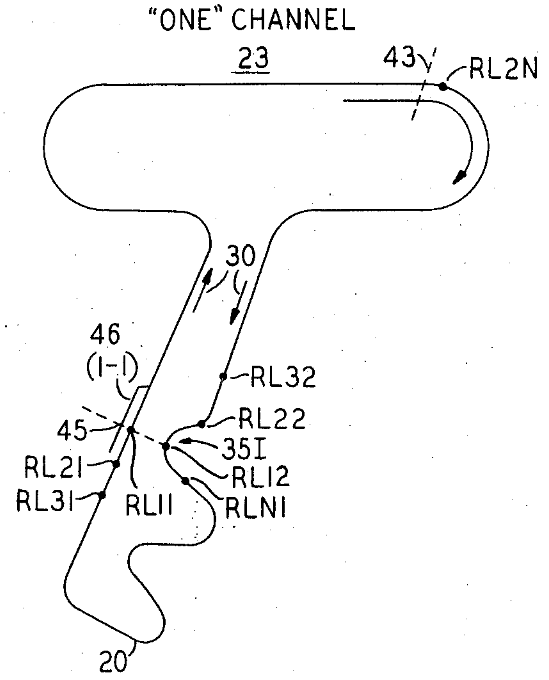
Figure 5:
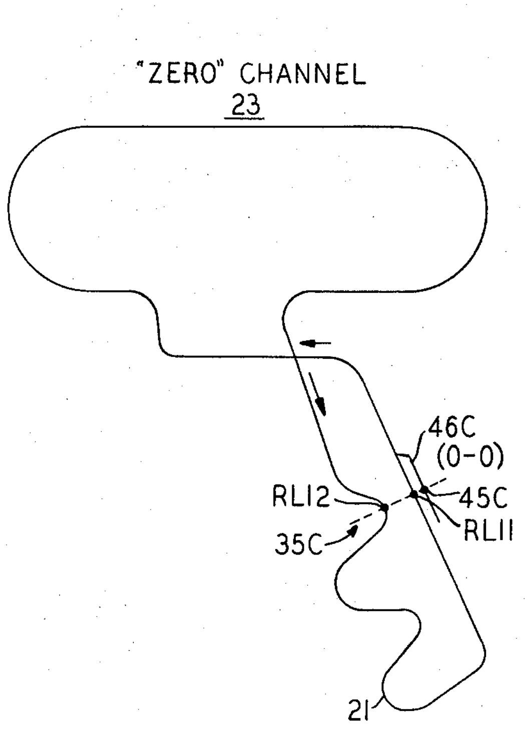

First, let us consider the general configuration of the separate channels which we designate the "one" channel and the "zero" channel in FIGS. 4 and 5, respectively. Each of the channels includes a meandering portion which is included herein solely to adjust path lengths to permit the arrival of information at interaction points 35I and 35C of FIG. 2 synchronously. All that is important here is that N stages occur between reference line 43 of FIG. 1 and each interaction point and between the interaction points themselves although in practice reference lines 43 may actually be adjacent to the interaction point (or position). Each of the channels can be seen to fold back on itself coming into close proximity with an earlier stage in each at the respective interaction points (35I and 35C) prior to convergence of the channels as shown at 41 in FIG. 3.

Consider FIG. 4 specifically. Domain patterns are advanced along the channel represented by line 20 through the interaction point 35I during each scan period. That is, a scan period involves the storage of a first domain pattern representative of the conditions of lines L1 through LN and the advance of the stored pattern N stages. This advance positions the representation for line L1 at 35I of FIG. 4. During the subsequent scan period, a second pattern is stored and both patterns are advanced N stages so that the consecutive representations for line L1 are at 35I in FIG. 4. If we designate the representation for a line L1 as RL1 and add to the designation a numeral identifying the scan period in which the representation occurs, we may designate consecutive representations conveniently, for example, for line L1 as RL11, RL12, RL13, etc.

At the termination of the second scan period both of the representations RL11 and RL12 are ready to enter the interaction point 35I as shown in FIG. 4. If we remember that information moves clockwise in FIG. 4 as indicated by arrows 30, we will recognize that information for the first and second scan periods is arranged as indicated by the dots RL11—RLN1 and RL12—RLN2 and the circuit is ready for the third scan period.

Each dot, of course, represents a domain or an absent domain representing in turn a binary one or the absence of a binary one depending on the line conditions during a given scan period. Consider the operation when two consecutive representations for a given line, say representations RL11 and RL12 are domains in channel 2D. In this case, an interaction occurs at 35I which causes domain RL11 to move to position 45 as shown in FIG. 4. If a domain were absent in either of the representations, RL11 or RL12, no domain would be present to move to position 45 or no domain would be present to cause an interaction respectively.

Figure 6:
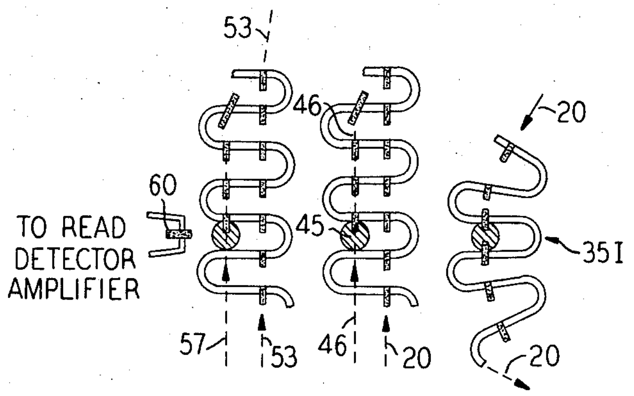

Position 45 is defined in a spur track 46, the permalloy elements and conductor arrangement for which are shown in FIG. 6. The track is operative to advance information (a domain) moved into it at 35I of FIG. 2 synchronously with information advancement in the "one" channel (20) of FIG. 4. Information moved to track 46 is reinserted in proper sequence back into the data stream moving along channel 20 as is clear at a glance from FIG. 6. Remember, information enters the spur track only if a domain occurs as the representation for the condition of a line (L1) in each of two consecutive scan periods, a condition represented by the designation (1—1) for the spur track.

The complementary operation occurs synchronously for the "zero" channel as shown in FIG. 5. If, for example, line L1 was on-hook during two consecutive scan periods, a domain in the reference channel in 23 of FIG. 2 remains in the reference channel when advanced. Under these conditions, a domain occurs at each of RL11 and RL12 in FIG. 5, rather than at RL11 and RL12 in FIG. 4, and the resulting interaction moves a domain to position 45C (for complementary). It may be appreciated that the occurrence of a domain at position 45C in a spur track 46C is representative of an on-hook (binary zero) condition for a line in each of two consecutive scan periods. This is represented as (0—0) in FIG. 5.

Due to the complementary organization of the arrangement, a change in the condition of a line appears significantly as a domain (1—1) at 45 in FIG. 4 followed by a domain at 45C (0—0) in a subsequent scan period — an operation entirely consistent with the operation described in my copending patent application Ser. No. 89,821, filed Nov. 16, 1970. Once again, normal operation results in the insertion of a domain at 45C back into the data stream moving in channel 21.

Figure 7:
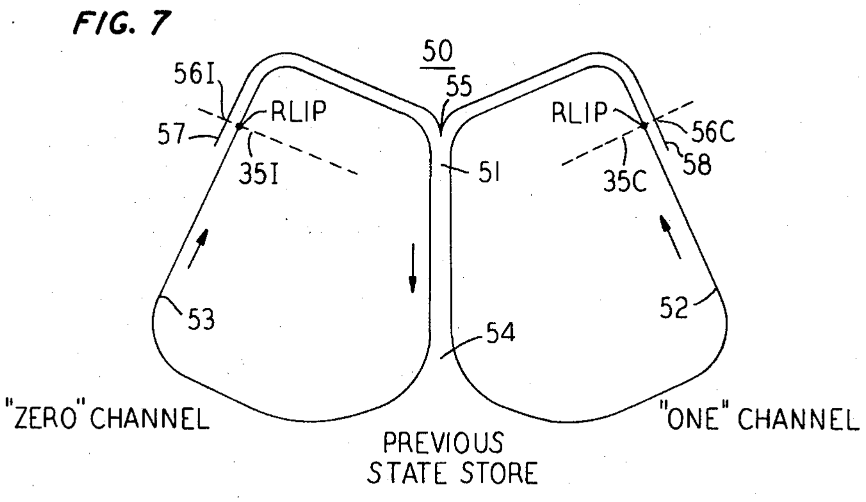

FIG. 7 shows an auxiliary LDC channel 50 which is defined as a channel pair only in area 51 and diverges into two physically separate channels 52 and 53 at juncture 54. The two separate channels converge again at juncture 55 as shown in detail in FIG. 8. Movement of domain patterns (and the complements thereof) in these channels is synchronous with the movement of domains in the channels of FIG. 2.

Each stage of channel 50 is occupied by a domain to the right or left of a rail (not shown). Domains to the right circulate counterclockwise about channel 52 and represent binary "ones" as indicated in FIG. 7. Similarly, domains to the left circulate clockwise in channel 53 and represent binary zeros.

FIG. 1 shows channels 50, 52, and 53 superimposed on channels 20 and 21 of FIG. 2. Of note, is that channels 20 and 53 and channels 21 and 52 are closely spaced at 35I and 35C respectively. The close spacing in each instance defines an interaction position at which a domain in position 45I of FIG. 4 (1—1) or in position 45C of FIG. 5 (0—0) interacts to move a domain at 35I in channel 53 or at 35C in channel 52 of FIG. 7 to positions 56I or 56C respectively. Positions 56I and 56C are defined in spur tracks 57 and 58, respectively, the former being shown in detail in FIG. 6.

The channel arrangement of FIG. 7 is operative as a "previous state" store. As an LDC arrangement, the channel pair 51 includes a domain in each stage thereof to a first or second side of a rail. The domains to the left side of the rail, as viewed in the figure, move about channel 53; those to the right move about channel 52. Consequently, every pair of associated stages in channels 52 and 53 include a domain and absence of a domain. If channel 52 is considered a binary one channel and 53 is considered a binary zero channel, then a binary one or a binary zero is moved to the position of 35C or 35I, respectively, each represented by the presence of a domain in the respective channel.

The presence of a domain in channel 52 at 35C coincident with a domain at position 45C of FIG. 5, representative of a 0—0 indication, causes the domain in channel 52 to move to position 56C of spur track 58 as shown in FIG. 7. The domain moved to the spur track moves, synchronously with the movement of all other information, counterclockwise towards portion 51. But spur track 58 is of a geometry to route information to the left side of 51. Yet information moved to spur track 58 originated at the right side of 51. If we remember that a pair of associated stages of the arrangement of FIG. 7 have only one domain, we may appreciate the the movement of a domain from channel 52 to spur track 58 at 35C in FIG. 7 results ultimately in a change in the representation of a binary one to a binary zero when that domain is returned to the left side of 51.

Similarly, the occurrence of a domain at 35I in channel 53 in FIG. 7 simultaneously with the occurrence of a domain (1—1) in spur track 45 in FIG. 4 results in a change in the representation by the movement of a domain to position 56I of spur track 57 in FIG. 7 and the resultant movement of that domain to the right side of 51.

Since the occurrence of a 0-0 representation corresponding to binary one in channel 52 indicates a sustained, changed line condition over two scan periods as compared to the line condition of a preceding (previous) scan period, channel 52 may be considered to be a previous scan store. Similarly, the occurrence of a 1—1 representation corresponding to a binary zero representation in channel 53 indicates a sustained changed line condition over two scan periods as compared to the line condition of a previous scan period. Consequently, the arrangement of FIG. 7 is operative as a "previous state store" and is so designated in the figure.

The resultant movement of a domain to spur track 57 or 58 in FIG. 7, representative of such a change in line condition is detected by detectors 60 and 61, respectively, as shown in FIG. 1. Detector 60 detects a change in state from a zero to a one. Detector 61 similarly detects a change in state from a one to a zero.

Figure 8:
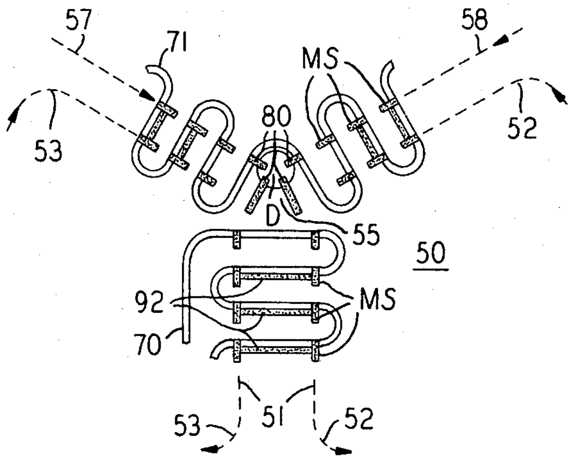

The operation of the previous state store depends on the convergence of channels 52 and 53 with spur tracks 57 and 58 as shown at 55 in FIG. 7. FIG. 8 shows an enlarged view of the magnetically soft elements and conductor geometry at 55. To be specific, magnetically soft elements of I-shaped geometries define stable position for domains in a lateral displacement arrangement as is now well known in the art. In addition, serpentine conductors 70 and 71, when pulsed, produce propagating fields for moving domains towards next sequential positions also as is well known in the art. FIG. 8 shows the detailed geometry at the convergence of several channels. It may be recognized that domains moving in either of channels 52 and 53 are routed to the corresponding sides of channel pair 51. Domains moving along spur tracks 57 and 58, on the other hand, although originating from channels 53 and 52, respectively, continue along the sides of channel pair 51 opposite to those from which they originated.

First we will discuss how this function is carried out in the context of FIG. 8. Thereafter, we will discuss the reason for this operation in terms of the scanner operation of the arrangement of FIG. 1.

The channel switching from the spur tracks 57 and 58 occurs at an idler position defined by magnetically soft elements 80 as shown in FIG. 8. A domain D occupies the position defined by element 80 and is not moved in response to pulses in conductor 71. Rather, domain D moves only when another domain moves along spur track 57 or 58 and then only in the direction in which that other domain moves it. From FIG. 8, it is clear that a domain moving along track 57 moves domain D into channel 52 where the latter enters the convergence area 55, the domain from track 57 taking the place of domain D. Consequently, such an idled domain moves along the right side of channel pair 51. Similarly, a domain originating on the right side of channel pair 51 for circulation initially counterclockwise about channel 52 is returned to the left side of channel pair 52 if and only if the domain is interacted with a domain in channel 21 (representing 0—0) for movement to spur track 58.

The arrangement of FIG. 1 includes detectors 60 and 61 for detecting a domain in spur tracks 57 and 58, respectively. A domain can occur only in one of the two spur tracks at a time since the information in the channel arrangement 50 of FIGS. 7 and 8 is complementary in form. Consequently, a domain occurs in spur track 57 only if a domain (1—1), representative of an off-hook indication for a particular line in each of two consecutive scan periods, appears in spur track 46 of FIG. 4 and a domain (which represents a previous on-hook indication) is moving synchronously in channel 53 for interaction with the (1—1) domain for movement to spur track 57. The domain so moved to spur track 57 records a change in state from an on-hook condition (zero) to an off-hook condition for two consecutive scan periods (1—1) and thus provides a signal at 60.

The domain so moved to spur track 57 continues along track 57 into area 55 as shown in FIG. 8 for return to the right side of channel pair 51 for subsequent recirculation about channel 52. Synchronously, an "absent domain" is moved into the position in channel 53 previously occupied by that domain moved to spur track 57. Since a detector can only detect a domain in spur track 57 or 58 and since only one of channels 52 and 53 includes a domain corresponding to a particular line for movement to such a track, the arrangement of FIG. 1 is now enabled to respond next only to a (0—0) domain indicating an on-hook condition for the particular line under consideration.

An idled domain is shown in FIG. 8 as enabling a convergence of a number of channels at 55. Intersections A, B, and C of FIG. 3 similarly include idler domains as shown there for implementing a cross over between channels. The elements 90 in the figure are of magnetically soft material disposed, as was the case above to define stable domain positions offset from positions to which domains are moved by pulses in conductor 91. The lines in FIG. 1 represent the series of consecutive domain positions so defined. When two lines approach one another in FIG. 1 as in area 23 to define an LDC channel pair, the magnetically soft elements and conductors appear as shown in FIG. 3, magnetically soft cross elements 92 being added in such instances to ensure lateral stability of the domains (lateral with respect to the axis of movement).

Detectors 60 and 61 are connected to a utilization circuit represented by block 70 in FIG. 1 which may comprise, for example, central office equipment. Sources 25, 27, and 28 and circuit 70 are connected to a control circuit, represented by block 71 of FIG. 1, for synchronization and activation. The various sources and circuits may be any such elements capable of operating in accordance with this invention.

What has been described is considered merely illustrative of the principles of this invention. Therefore, various modification can be devised by those skilled in the art in accordance with those principles within the spirit and scope of this invention.

What is claimed is:

1. A magnetic arrangement comprising a layer of material in which single wall domains can be moved, means for defining in said layer a first multistage channel pair including a first and an $N^{th}$ stage for moving single wall domains therealong, a rail arrangement for defining to first and second sides thereof first and second stable positions respectively for a domain in each of said stages, means for defining second and third multistage channels for returning domains from said $N^{th}$ to said first stage to said first and second sides of said rail respectively, said second and third channels being of geometries such that the $(N+m)^{th}$ and the $(N+m)^{th}$ stages of each of said second and third channels are closely spaced for defining first and second interaction stages, respectively, and means for defining first and second spur tracks at said first and second interaction stages, respectively, said spur tracks being arranged to receive a domain from the associated $(N+m)^{th}$ stage only when both that stage and the associated $(N+m)^{th}$ stage include domains and to return a domain so received to the originating channel.

2. A magnetic arrangement in accordance with claim 1 wherein said first channel pair comprises a first lateral displacement coding channel each stage therein always including one of said domains to said first or second side of said rail representing a binary one or a binary zero respectively, and said first side of said first channel and said second channel comprise a "binary one" closed loop channel and said second side of said first channel and said second channel comprises a "binary zero" closed loop channel.

3. A magnetic arrangement in accordance with claim 2 also comprising input means coupled to said first through $N^{th}$ stages of said first channel pair for selectively determining the position occupied by said domain in each of said stages responsive to external signals.

4. A magnetic arrangement in accordance with claim 3 also including a second multistage channel pair including a rail to first and second sides of which domains represent binary zeros and ones, respectively, and third and fourth binary one and binary zero channels for defining closed loops with the stages of said second and first sides, respectively, said third and fourth channels being coupled to said first and second spur tracks, respectively, in a manner such that the presence of a domain in said first or second spur track causes a domain synchronously in said third or fourth channel there to be displaced from the respective channels.

5. A magnetic arrangement in accordance with claim 4 also including third and fourth spur tracks disposed to receive domains displaced from said third and fourth closed loop channels respectively.

6. A magnetic arrangement in accordance with claim 5 wherein each of said closed loop channels defined by said second multistage channel pair and said third and fourth channels comprise N stages and said third and fourth spur tracks are adapted to return domains displaced thereto to the positions associated with the original positions of the domains in said second multistage channel pair but to the opposite side of the rail there thus indicating a change in the information represented thereby.

7. A magnetic arrangement in accordance with claim 6 also including first and second detectors for detecting the presence of a domain in said third or fourth spur track, respectively.

8. A magnetic arrangement comprising a layer of magnetic material in which single wall domains can be moved, rail means for defining in said layer a multistage channel pair in each stage of which said rail defines alternative first and second laterally displaced positions for a domain to first and second sides thereof, respectively, means for defining first and second multistage domain propagation channels for defining first and second closed loop channels including said first positions and said second positions, respectively, and first and second spur tracks closely spaced apart from an interaction stage of said first and second channels, respectively, for receiving domains selectively displaced from respective ones of said interaction stages, each of said spur tracks being of a geometry to return a domain received thereby to the position alternative to the position from which it originated.

9. A magnetic arrangement in accordance with claim 8 also including means for selectively displacing domains from said first or second spur tracks.

* * * * *